(12) United States Patent
Ryu et al.

(10) Patent No.: US 10,734,792 B2
(45) Date of Patent: Aug. 4, 2020

(54) BUS CONDUCTOR CONNECTION STRUCTURE FOR ELECTRIC FIELD RELAXATION

(71) Applicant: Hyosung Heavy Industries Corporation, Seoul (KR)

(72) Inventors: Jae Gil Ryu, Busan (KR); Nak Geun Cho, Changwon-si (KR); Hyun Sub Sim, Busan (KR); Yun Ho Cho, Changwon-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 0 days.

(21) Appl. No.: 16/472,416

(22) PCT Filed: Dec. 11, 2017

(86) PCT No.: PCT/KR2017/014462
§ 371 (c)(1),
(2) Date: Jun. 21, 2019

(87) PCT Pub. No.: WO2018/117512
PCT Pub. Date: Jun. 28, 2018

(65) Prior Publication Data
US 2019/0363524 A1    Nov. 28, 2019

(30) Foreign Application Priority Data

Dec. 21, 2016 (KR) .................... 10-2016-0176086

(51) Int. Cl.
*H02B 13/035* (2006.01)
*H01R 4/30* (2006.01)
(Continued)

(52) U.S. Cl.
CPC ......... *H02B 13/0358* (2013.01); *H01R 4/308* (2013.01); *H02B 13/045* (2013.01); *H02B 13/075* (2013.01)

(58) Field of Classification Search
CPC .............. H02B 13/0358; H02B 13/075; H02B 13/035; H01R 4/308
See application file for complete search history.

(56) References Cited

U.S. PATENT DOCUMENTS

| 10,060,195 | B2* | 8/2018 | Moeny ....................... E21B 7/15 |
| 2016/0017663 | A1* | 1/2016 | Moeny ....................... E21B 7/15 |
|  |  |  | 175/327 |
| 2019/0363524 | A1* | 11/2019 | Ryu ................... H02B 13/0358 |

FOREIGN PATENT DOCUMENTS

| JP | 2011-114928 A | 6/2011 |
| JP | 2014-030282 A | 2/2014 |

(Continued)

*Primary Examiner* — Abdullah A Riyami
*Assistant Examiner* — Nader J Alhawamdeh
(74) *Attorney, Agent, or Firm* — Novick, Kim & Lee, PLLC; Jae Youn Kim

(57) ABSTRACT

The present invention relates to a bus conductor connection structure for electric field relaxation. The bus conductor connection structure for electric field relaxation includes: an enclosure filled with an inert gas; spacers coupled to two side end portions of the enclosure in a facing contact manner and having connection conductors; conductors provided with predetermined intervals being maintained inside the enclosure; and coupling portions formed in end portions of the conductors, wherein the coupling portion is coupled to the connection conductor in a close contact manner with bolts. Accordingly, the bus conductor connection structure for electric field relaxation is allowed to simply fixing conductors and assembling bolts of a gas insulated bus and to reduce a size of the bus by shortening an insulation (Continued)

distance between the bus and the ground by using a shape and arrangement for electric field relaxation.

6 Claims, 6 Drawing Sheets

(51) Int. Cl.
*H02B 13/045* (2006.01)
*H02B 13/075* (2006.01)

(56) References Cited

FOREIGN PATENT DOCUMENTS

| KR | 10-1135207 B1 | 4/2012 |
|---|---|---|
| KR | 10-2016-0080022 A | 7/2016 |
| KR | 20-2016-0003011 U | 9/2016 |

* cited by examiner

BUS CONDUCTOR CONNECTION STRUCTURE FOR ELECTRIC FIELD RELAXATION

TECHNICAL FIELD

The present invention relates to a bus conductor connection structure for electric field relaxation, and particularly, to simply fixing conductors and assembling bolts of a gas insulated bus and to reduce a size of the bus by shortening an insulation distance between the bus and the ground by using a shape and arrangement for electric field relaxation.

BACKGROUND ART

Generally, a gas insulated switch is located inside a substation between a 3-phase high voltage and an overhead transmission bus. If an abnormal voltage such as lightning or a surge voltage is detected, the gas insulated switch serves to block a current.

The gas insulated switch includes a bushing that is applied with a power from a 3-phase high-voltage power source, a gas insulated bus that transfers the power applied to the bushing to a gas insulated breaker, and a gas insulated breaker that blocks the power applied from the gas insulated bus.

As illustrated in FIG. 6, the gas insulated bus includes a tank 70 filled with an inert gas, conductors 71 provided with a predetermined interval being maintained inside the tank 70, and insulation spacers 72 arranged transverse to the longitudinal direction of the conductors 71 and supporting the conductors 71. The conductors 71 having three phases are provided inside the tank 70.

The insulation spacer 72 includes an insulator 721 and a connection conductor 722 coupled to the end surface of the insulator 721 and the end surface of the conductor 71 along the longitudinal direction of the conductor 71, and in order to maintain the facing contact, the conductor 71 is assembled to the connection conductor 722 by using bolts 73. The end side of the conductor 71 is coupled to attachment members 74 by welding. The attachment member 74 formed by molding has an attachment groove 741 where the bolt 73 is attached. Electric field is highly likely to be concentrated on the attachment groove and corners of the attachment groove. Therefore, dielectric breakdown may occur, and thus, there is a problem in that bus-to-ground short circuit occurs.

The attachment grooves of the attachment members small and are formed in several directions, so that there is a problem in that it is difficult to attach the bolt in the process of assembling. Therefore, there are problems in that the assembling and dissembling operations are difficult, and work time becomes long.

In addition, there is a problem in that the insulation distance between the bus and the ground is increased, and the size of the bus is increased.

SUMMARY OF INVENTION

Technical Problem

The present invention is to prevent occurrence of dielectric breakdown by simplifying conductor fixation of a gas insulated bus and preventing electric field concentration, to prevent bus-to-ground short circuit in advance, to reduce a size of the bus by shortening an insulation distance between the bus and the ground by using an arrangement for electric field relaxation, to allow assembling and dissembling to be easily performed by easy attachment of bolts in a process of assembling, and to reduce a time required for work.

Solution to Problem

According to an aspect of the present invention, there is provided a bus conductor connection structure for electric field relaxation, including: an enclosure filled with an inert gas; spacers coupled to two side end portions of the enclosure in a facing contact manner and having connection conductors; conductors provided with predetermined intervals being maintained inside the enclosure; and coupling portions formed in end portions of the conductors, wherein the coupling portion is coupled to the connection conductor in a close contact manner with bolts.

In the above aspect, the enclosure has a cylindrical shape and is made of a metal, and flanges having a ring shape are formed in the two side end portions of the enclosure.

In the above aspect, the coupling portion includes: a hollow coupling body; a disc-type flange piece formed in one side end portion of the hollow coupling body, the disc-type flange piece having a plurality of through holes; a joint portion formed so that the other side end portion of the hollow coupling body is connected to the conductor; and an opening formed by cutting out a portion of the hollow coupling body between the disc-type flange piece and the joint portion.

In the above aspect, a portion of the hollow coupling body where the opening is formed has a semi-cylindrical shape.

In the above aspect, a portion of the hollow coupling body where the opening is formed is arranged to be directed toward a center of the enclosure.

In the above aspect, the hollow coupling body is formed to have a diameter larger than a diameter of the conductor.

In the above aspect, the three conductors are arranged with equal intervals or equal angles inside the enclosure.

Advantageous Effects of Invention

According to the present invention, it is possible to prevent occurrence of dielectric breakdown by simplifying conductor fixation of a gas insulated bus and preventing electric field concentration, to prevent bus-to-ground short circuit in advance, to reduce a size of the bus by shortening an insulation distance between the bus and the ground by using an arrangement for electric field relaxation, to allow assembling and dissembling to be easily performed by easy attachment of bolts in a process of assembling, and to reduce a time required for work.

DESCRIPTION OF EMBODIMENTS

Figure 1:
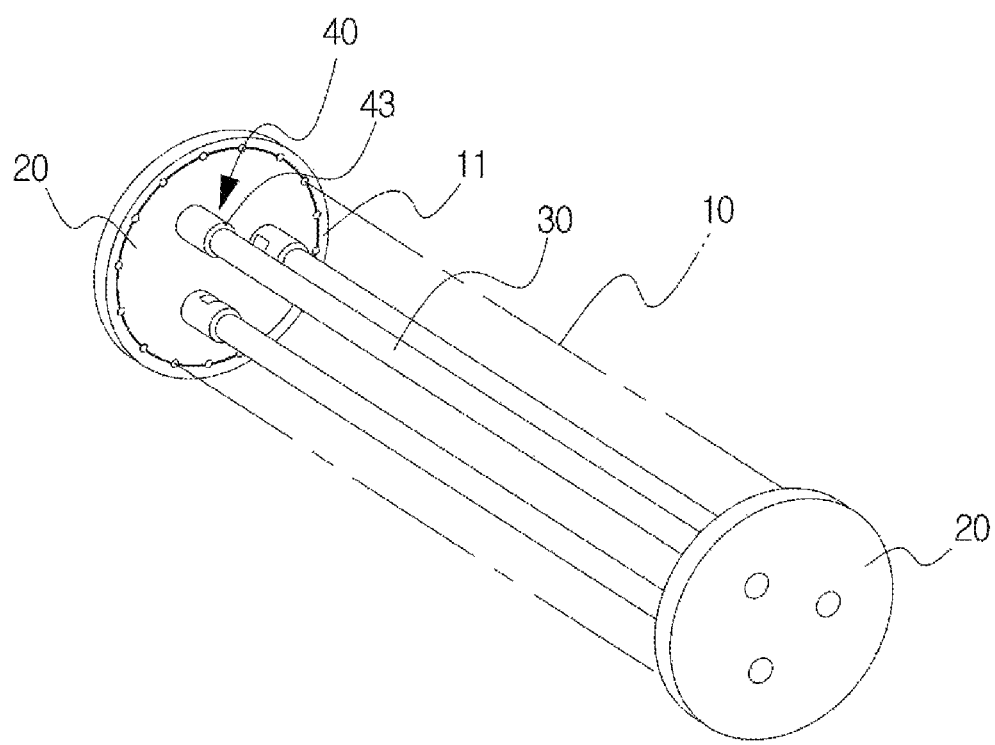
FIG. 1 is a schematic perspective view illustrating a bus conductor connection structure for electric field relaxation according to the present invention.

Hereinafter, specific embodiments for carrying out the present invention will be described with reference to the accompanying drawings.

In describing the invention, the terms first, second, and the like may be used to describe various components, but the components may not be limited by the terms. The terms are used only for the purpose of distinguishing one component from the others. For example, without departing from the scope of the present invention, a first component may be referred to as a second component, and similarly, a second component may also be referred to as a first component.

In a case where a component is referred to as being connected to or coupled with another component, the component may be directly connected to or coupled with another component, but it may be understood that still another component may exist between the components.

The terms used herein are used for the purpose of describing particular embodiments only and are not intended to limit the invention. The singular expressions may include plural expressions unless the context clearly denotes otherwise.

It is to be understood that, in the present specification, the terms "comprising", "including", and the like are intended to specify the presence of features, numbers, steps, operations, elements, components, or combinations thereof described in the specification, but the terms do not preclude the presence or addition of one or more other features, numbers, steps, operations, elements, components, or combinations thereof.

In addition, shapes and sizes the elements in the drawings may be exaggerated for clarity.

Figure 2:
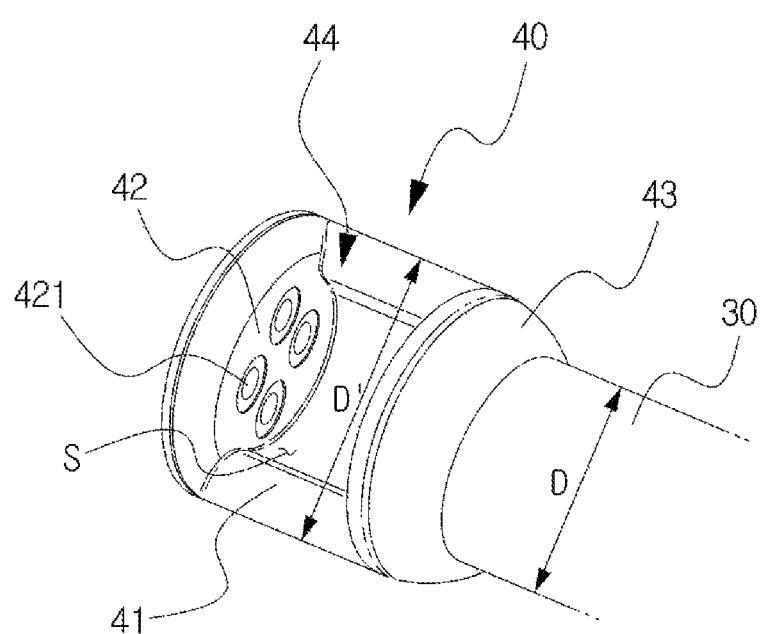
FIG. 2 is an enlarged perspective view illustrating a coupling portion provided in an end portion of a conductor in the bus conductor connection structure for electric field relaxation according to the present invention.
Figure 3:
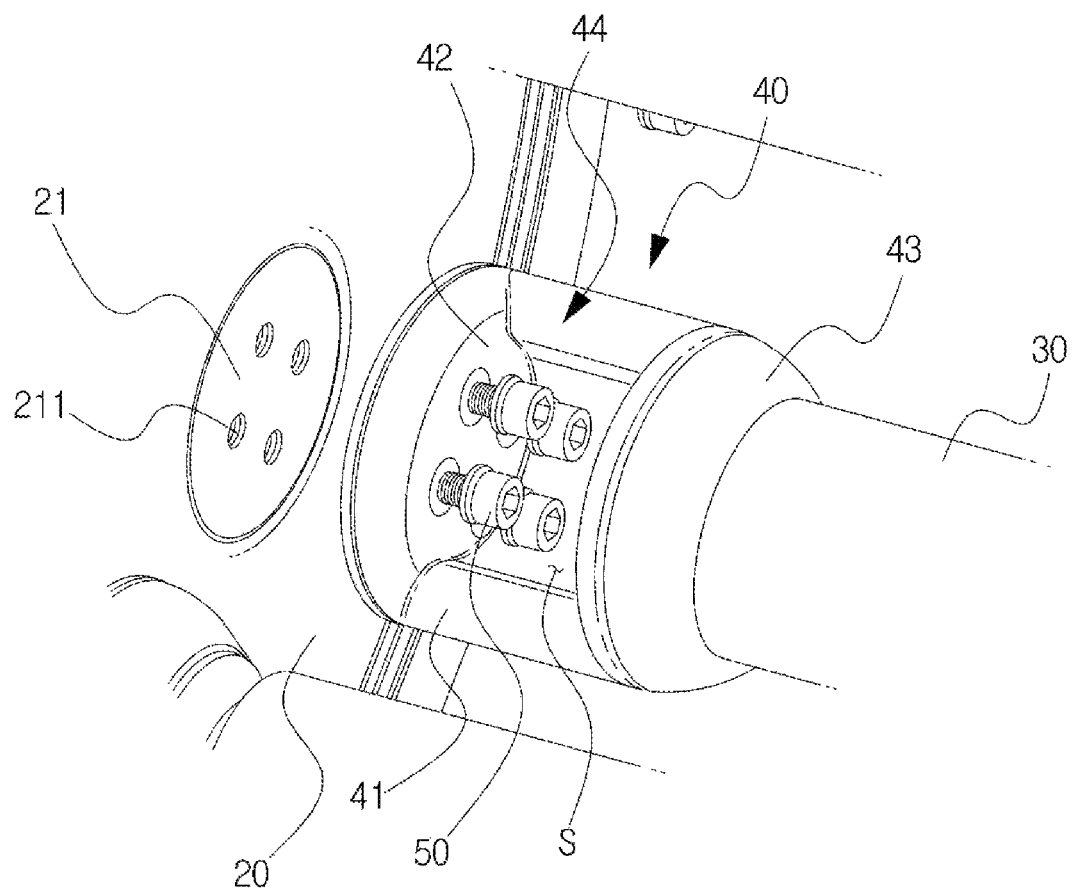
FIG. 3 is a perspective view illustrating a state where the coupling portion is detached from a connection conductor of a spacer in the bus conductor connection structure for electric field relaxation according to the present invention.
Figure 4:
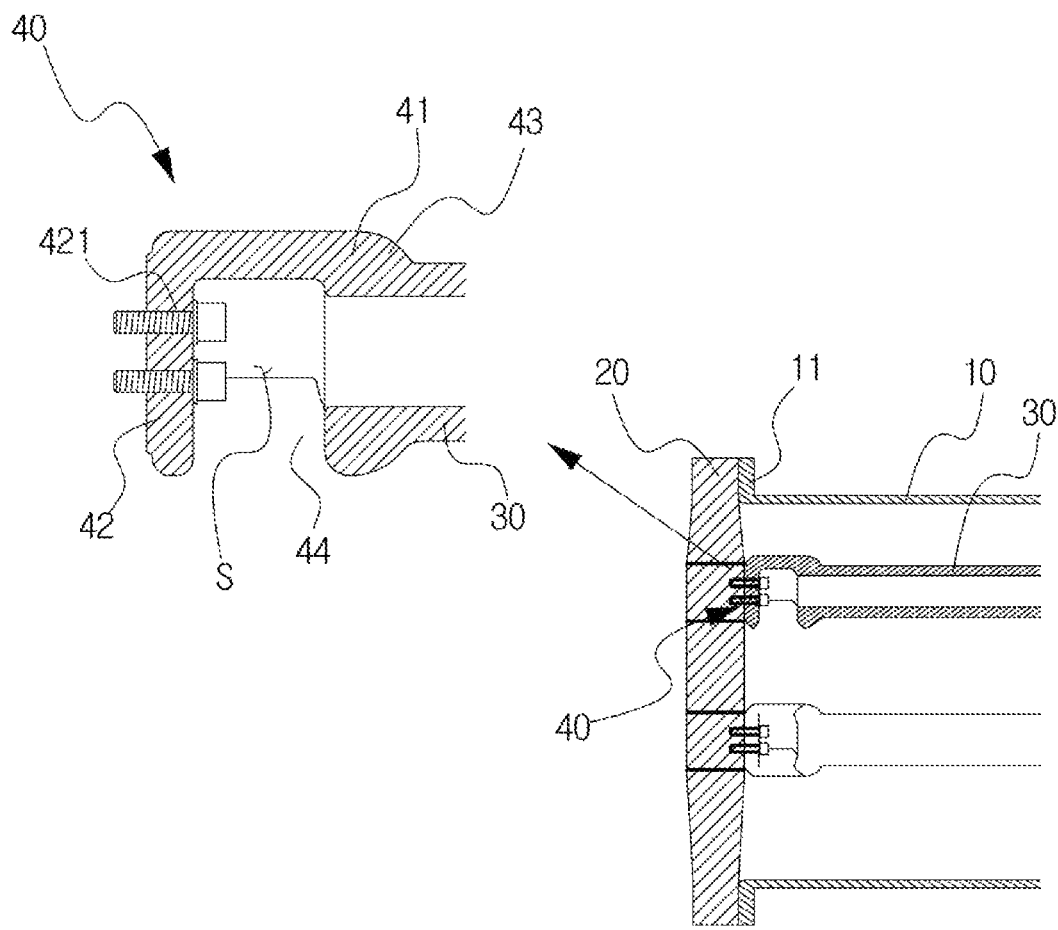
FIG. 4 is a longitudinal cross-sectional view illustrating the bus conductor connection structure for electric field relaxation according to the present invention.
Figure 5:
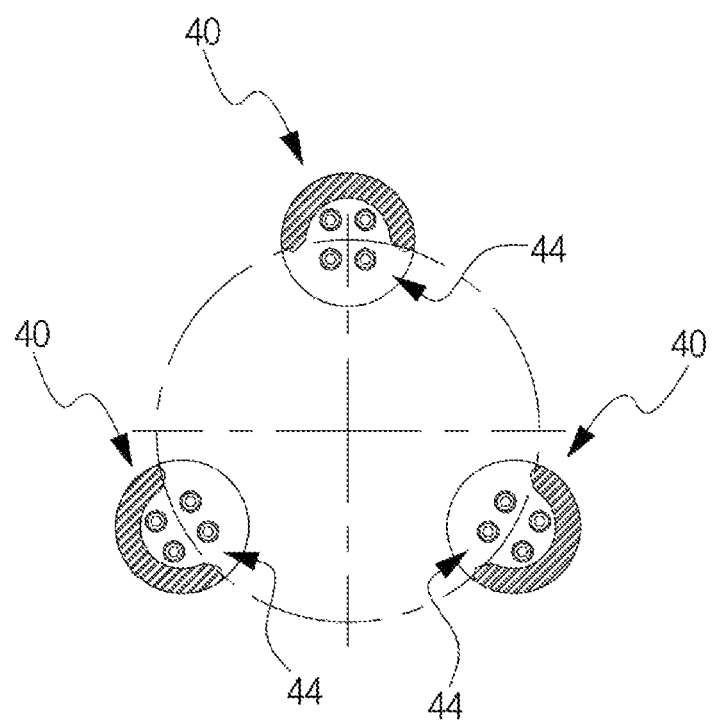
FIG. 5 is an exemplary view illustrating a state of arrangement of the coupling portions provided in the end portions of the conductors in the bus conductor connection structure for electric field relaxation according to the present invention.
Figure 6:
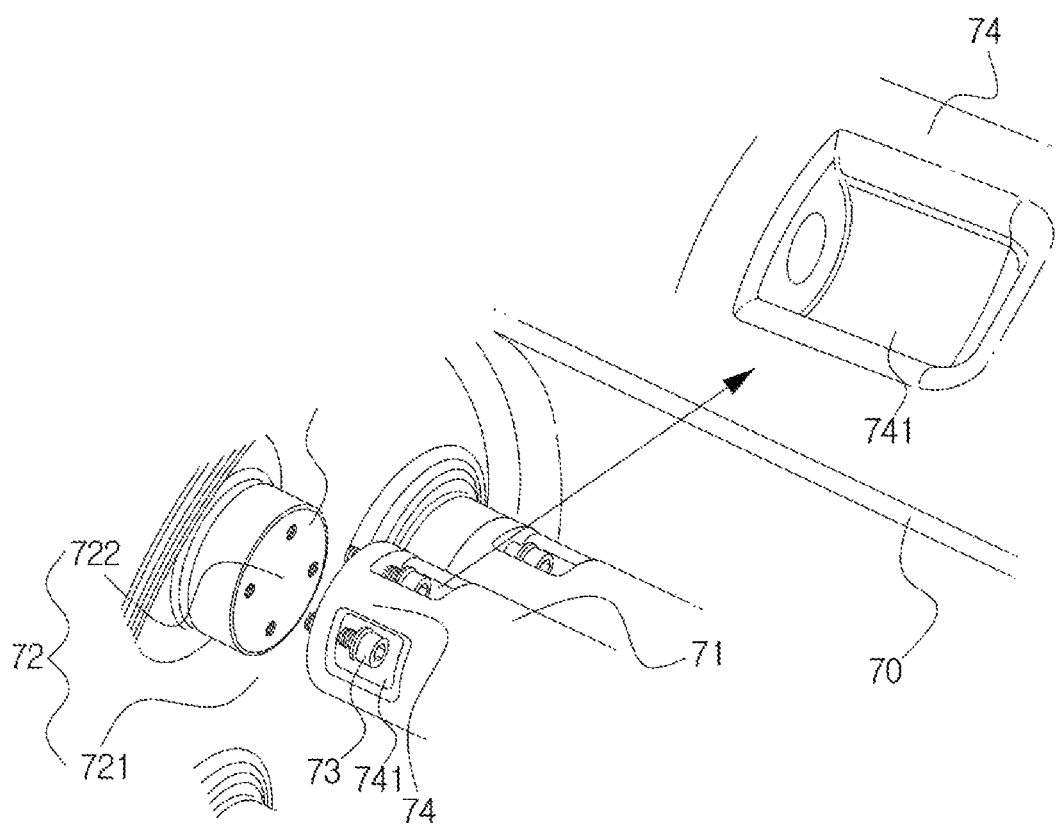
FIG. 6 is an exploded perspective view illustrating bus conductor connection structure in the related art.

FIG. 1 is a schematic perspective view illustrating a bus conductor connection structure for electric field relaxation according to the present invention. FIG. 2 is an enlarged perspective view illustrating a coupling portion provided in an end portion of a conductor in the bus conductor connection structure for electric field relaxation according to the present invention. FIG. 3 is a perspective view illustrating a state where the coupling portion is detached from a connection conductor of a spacer in the bus conductor connection structure for electric field relaxation according to the present invention. FIG. 4 is a longitudinal cross-sectional view illustrating the bus conductor connection structure for electric field relaxation according to the present invention. FIG. 5 is an exemplary view illustrating a state of arrangement of the coupling portions provided in the end portions of the conductors in the bus conductor connection structure for electric field relaxation according to the present invention.

A bus conductor connection structure for electric field relaxation according to the present invention is configured so as to allow assembling and dissembling to be easily performed by easy attachment of bolts, to prevent occurrence of dielectric breakdown and bus-to-ground short circuit by preventing electric field concentration, to reduce a time required for work.

As illustrated in FIGS. 1 to 5, the bus conductor connection structure for electric field relaxation includes an enclosure 10, spacers 20, conductors 30, coupling portions 40, and bolts 50. The enclosure 10 is filled with an inert gas. The spacers 20 are provided with connection conductors 21 to be coupled to two ends of the enclosure 10 in a facing contact manner.

The conductors 30 are provided inside the enclosure 10 so as to maintain a predetermined interval. The coupling portion 40 formed in the end portion of the conductor 30 is coupled to the connection conductor 21 in a facing contact manner with the bolts 50.

Herein, the enclosure 10 has a cylindrical shape and is made of a metal. The two end portions of the enclosure 10 are provided with respective flanges 11 having a ring shape so as to maintain a state where the spacer 20 is stably coupled and to maintain hermetical sealing.

The spacers 20 are provided with the respective connection conductors 21. The connection conductors 21 configured with insulators having a disc shape. The connection conductors 21 are arranged at predetermined angles around the center as a reference. In the connection conductor 21, female screws 211 to be screw-coupled with the bolts 50 are formed so that the centers of the female screws 211 are coincident with the centers of through holes 421 formed in the one end portion of a coupling body 41 described later.

The conductor 30 having a cylindrical shape has a function of transporting a current. The two end portions of the conductor 30 are symmetrically provided with the respective coupling portions 40. The two end portions of the conductor 30 are provided so as to be easily coupled to and decoupled from the connection conductor 21 provided in the one side end of the spacer 20 and the connection conductor (not shown) provided in the other side end of the spacer 20 in a facing contact manner with the bolts 50.

The coupling portion 40 includes a hollow coupling body 41, a disc-type flange piece 42, a joint portion 43, and an opening 44. The disc-type flange piece 42 including a plurality of through holes 421 is provided in the one side end portion of the hollow coupling body 41.

In the joint portion 43, the other side end portion of the hollow coupling body 41 is coincident with the center. The joint portion 43 is configured to have a predetermined interval space S so that a bolting operation is easily performed. The opening 44 is formed by cutting out a portion of the hollow coupling body 41 between the disc-type flange piece 42 and the joint portion 43. The opening 44 is configured so that the bolts 50 are easily inserted into or extracted from the interval space S of the coupling portions 40. Therefore, a space enough to fasten or release the bolts 50 is secured, so that bolting assembling and dissembling operations can be easily performed.

In the hollow coupling body 41, the opening 44 is formed to have a semi-cylindrical shape, so that it is possible to stably support the conductor 30 and to prevent electrical field concentration so as to prevent dielectric breakdown and bus-to-ground short circuit.

In the hollow coupling body 41, the portion where the opening 44 is formed is aligned toward the center of the enclosure 10, as described above, so that it is possible to further prevent the electric field from concentrating on the corner portion. The hollow coupling body 41 is formed to have a diameter D' larger than a diameter D of the conductor 30 to have such a sufficient strength that the conductor 30 can be stably supported.

The three conductors 30 are arranged with equal intervals or equal angles inside the enclosure 10. Therefore, curving of the surface of the conductor 30 to be in contact with the enclosure 10 is minimized, so that the effect of the electric field between the bus and the ground can be reduced, and the assembling and dissembling of the bolts 50 can be operated in one direction, so that workability can be improved.

In the process of connecting the conductor, first, the disc-type flange piece 42 of the coupling portion 40 formed in the end portion of the conductor 30 is allowed to face the connection conductor 21 of the spacer 20. When the center of the through hole 421 formed in the disc-type flange piece 42 is allowed to be coincident with the center of the female screw 211 formed in the connection conductor 21, the opening 44 formed in the coupling portion 40 is directed toward the center of the enclosure 10.

Next, the bolts 50 are allowed to be inserted through the opening 44. After that, the bolts 50 are allowed to pass through the through hole 421 formed in the disc-type flange piece 42 and to be screw-coupled with the female screws 211 of the connection conductor 21 by using a tool (not illustrated). These processes are repeated, and thus, the coupling portion 40 is coupled to the connection conductor 21.

Next, by repeating these processes, the one side spacer 20 is coupled to the three conductors 30 at the one side, and after that, the other side spacer 20 is coupled to the three conductors 30 at the other side. The enclosure 10 is allowed to be provided between the one side spacer 20 and the other side spacer 20, so that the connection of the conductors is completed.

On the other hand, the detaching or dissembling of the conductors 30 is a reverse process of the process described above.

It should be noted that the above-described embodiments are for the purpose of description and are not intended for limitation thereof. In addition, it will be understood by the ordinarily skilled in the art that various embodiments are possible within the scope of the technical idea of the present invention.

INDUSTRIAL APPLICABILITY

The present invention relating to a bus conductor connection structure for electric field relaxation can be used for a gas insulated switching device.

REFERENCE SIGNS LIST

10: enclosure
11: flange
20: spacer
21: connection conductor
30: conductor
40: coupling portion
41: hollow coupling body
42: disc-type flange piece
43: joint portion
44: opening
50: bolt

The invention claimed is:

1. A bus conductor connection structure for electric field relaxation, comprising:
    an enclosure filled with an inert gas;
    spacers coupled to two side end portions of the enclosure in a facing contact manner and having connection conductors;
    conductors provided with predetermined intervals being maintained inside the enclosure; and
    coupling portions formed in end portions of the conductors,
    wherein the respective coupling portion is coupled to the respective connection conductor in a close contact manner with bolts,
    wherein the respective coupling portion includes:
    a hollow coupling body;
    a disc-type flange piece formed in one side end portion of the hollow coupling body, the disc-type flange piece having a plurality of through holes;
    a joint portion formed so that the other side end portion of the hollow coupling body is connected to the respective conductor; and
    an opening formed by cutting out a portion of the hollow coupling body between the disc-type flange piece and the joint portion.

2. The bus conductor connection structure for electric field relaxation according to claim 1, wherein the enclosure has a cylindrical shape and is made of a metal, and flanges having a ring shape is formed in the two side end portions of the enclosure.

3. The bus conductor connection structure for electric field relaxation according to claim 1, wherein a portion of the hollow coupling body where the opening is formed has a semi-cylindrical shape.

4. The bus conductor connection structure for electric field relaxation according to claim 1, wherein a portion of the hollow coupling body where the opening is formed is arranged to be directed toward a center of the enclosure.

5. The bus conductor connection structure for electric field relaxation according to claim 1, wherein the hollow coupling body is formed to have a diameter larger than a diameter of the respective conductor.

6. The bus conductor connection structure for electric field relaxation according to claim 1, wherein the conductors comprise three conductors which are arranged with equal intervals or equal angles inside the enclosure.

* * * * *